Patented Aug. 7, 1934

1,969,275

UNITED STATES PATENT OFFICE 1,969,275

METHOD OF FORMING RUBBER ARTICLES

Stewart R. Ogilby, Staten Island, N. Y., assignor to The Naugatuck Chemical Company, Naugatuck, Conn., a corporation of Connecticut No Drawing. Application October 20, 1933, Serial No. 694,520

11 Claims. (Cl. 18—58)

This invention relates to methods of forming rubber articles and more particularly to methods of forming rubber articles directly by deposition of rubber from rubber latex.

The preparation of rubber articles by deposition from latex on to a form or deposition base surfaced with a latex coagulant is well known. Rubber articles have been produced by treating a porous or non-porous form first with a coagulant, such as acetic acid or the like, and then dipping the treated form into latex, retaining the form in the latex until the desired thickness of rubber has been coagulated on the surface, removing the form and then drying to form the finished article. Various modifications of this process are known wherein a hollow porous form is used and the coagulant is retained in the form itself and allowed to seep out from the interior of the form to the surface thereof, thereby coagulating rubber on the surface of the form from the latex in which the form may be submerged. Porous and non-porous forms have been coated with an absorbent material, such as gelatin and the like, into which has been incorporated a coagulating material, and the treated form dipped into latex until a film of the desired thickness has been produced on the surface of the form, and then the form removed and the deposit dried. Dipping forms and the like have also been first treated with latex and then dipped into a coagulant which coagulates the latex coating and provides a coagulant associated with the newly coagulated latex layer which will diffuse into the latex on a subsequent dipping and coagulate on the previously coagulated latex layer, a second film of latex coagulum. Similarly, latex forms have been surfaced with a rubber cement which may contain a coagulant such as acetic acid or surfaced with dried rubber in numerous ways and then treated with a latex coagulant to absorb the same in the rubber surface prior to dipping into latex to produce a rubber film of the desired thickness. The disadvantages of the majority of these methods are obvious. When treating a non-porous form with a liquid coagulant alone, it is practically impossible to get enough coating of uniform thickness to give the desired thickness of deposited rubber film. Those cases where a coagulant diffuses through the pores of the form itself are limited to porous forms which in many cases are prohibitively expensive. Other processes necessitate two or more step operations for preparing the form, while still other processes, such as in coating the form with rubber cement and coagulant, whether by one or two step process as above described, provide a substantially water impervious film of rubber from only the surface of which is the coagulant capable of diffusing readily into the latex.

The present invention relates more particularly to methods of forming rubber articles whereby a base may be coated with a latex coagulant associated with a rubber material in such a way that the coating on the base is substantially water permeable and the coagulant is free throughout the thickness of the applied coagulating coating to diffuse into latex into which the form may be dipped.

According to the present invention, the deposition form or base is coated with a porous rubber layer containing a latex coagulant in the pores or interstices thereof so that when the form is immersed into latex, the coagulant is free to diffuse into the latex not only from merely the outer surface of the treated form, but from the interior of all portions of the coating. A coating of rubber from latex may then be obtained by immersing the thus treated form in latex and allowing the same to remain in the latex until sufficient coagulant has diffused into the latex to provide the desired thickness of latex coagulum, the structure of the coating on the form at all times allowing diffusion of coagulant from the inside of the same outwardly to the latex surface in contact therewith.

Various methods may be utilized for providing the desired porous rubber layer containing latex coagulant in the pores or interstices of the same. A present preferred method of carrying out the invention is illustrated below, but it is not desired thereby to limit the invention since many other methods of producing the desired result will occur to persons skilled in the art.

A solution of hydrated magnesium acetate (which is exemplary of a latex coagulant) is prepared by dissolving 100 grams of the salt in 125 grams of water, and adding 70 grams of 95% ethyl alcohol. Then 85 grams of the resulting solution are mixed with 200 grams of a 5% rubber cement made with 70–73° Bé. naphtha. The resulting mixture, which is a clear solution, contains an amount of alcohol which is just short of that required to cause incipient flocculation of the rubber. The dipping form is then dipped in this solution and removed, the solution, of course, being viscous enough to provide an appreciable thickness of coating. On removing the form from the liquid, the naphtha, being the more volatile, evaporates more rapidly than the alcohol, thereby causing an increase in the proportion of alcohol relative to the naphtha. Since the initial composition of the coating liquid includes an amount of alcohol which is just short of that required to cause incipient flocculation of the rubber, the coating sets to a non-flowing gel or porous rubber layer shortly after the coated form is removed from the body of liquid, due to the rapid evaporation of the naphtha and the insolubility of the rubber in the remaining mixture. Instead of alcohol, other "desolvating agents" (organic liquids which are substantially non-solvents of rubber but soluble in rubber solvents) having a lower vapor pressure than the rubber solvent utilized in the preparation of the rubber cement and hence which evaporate less rapidly than the rubber solvent may be used. For example, an amount of a desolvating agent such as acetone or methyl acetate or the like just short of that required to cause incipient flocculation of the rubber in the coating composition may be utilized instead of the alcohol shown in the example. At this point, the coating consists of a reticulate rubber film containing rubber solvent, and a liquid phase including the latex coagulant in the interstices of the film. The form as thus treated may then be dipped into a latex bath. If desired, however, the more volatile constituents, namely, alcohol and naphtha, may be further or completely evaporated as by heating the coated form at an elevated temperature for a short period of time, say at 180° F. for 15 to 30 minutes. If the alcohol and naphtha are substantially removed by such treatment, the coating then consists of a porous network of rubber free of rubber solvent and containing only an aqueous solution of the magnesium salt in the continuous aqueous phase in the interstices. The liquid phase, however, cannot drain off as it is firmly held in the porous layer of rubber, presumably by capillary forces. If desired, complete evaporation of the water may take place leaving the dry latex coagulant distributed throughout the porous structure. On dipping a form treated according to the present invention into the latex, the coagulant, being contained in open pores and being accessible to the aqueous phase of the latex, is capable of diffusing freely and rapidly into the latex from any portion throughout the entire thickness of the rubber layer, thus effecting a rapid deposition of latex solids on the form. During subsequent drying and/or vulcanization, the porous rubber stratum coalesces and becomes water-impermeable and integral with the latex deposit.

Various other salts which are latex coagulants, for example, zinc acetate, calcium chloride, magnesium sulphate and calcium sulphate, may be utilized instead of the magnesium acetate shown in the above illustration. Other well known latex coagulants may be utilized providing of course, that on the setting of the organic solvent solution of rubber to a non-flowing gel, the coagulant is associated with the liquid phase which is immiscible with the rubber-containing phase. If desired an aqueous solution or suspension of a latex coagulant, for example, may be emulsified in an organic solvent solution of rubber to form a fluid rubber cement which may be applied to the desired base and which upon sufficient evaporation of the rubber solvent sets to a non-flowing porous rubber film containing water and coagulant in the pores. The deposition base may itself become part of the finished rubber article, or the deposited rubber, preferably after drying, may be removed from the base as is well known in the art. The term "latex" in the description and claims is used to designate broadly coagulable dispersions of elastic materials, including artificial dispersions of rubber or rubber-like materials as well as natural latex, which may be preserved or compounded or otherwise treated as desired and which may be in a normal, diluted, concentrated, or purified condition produced by methods well known in the art. Such a latex may be unvulcanized and, if desired, may contain vulcanizing ingredients, or it may be prevulcanized, all as is well known in the art. The coating containing the coagulant may, of course, be applied to the form or base by methods such as dipping, spreading, spraying or the like, and the latex may subsequently be applied in a similar manner to the thus treated form.

In view of the many changes and modifications that may be made without departing from the principles underlying the invention, reference should be made to the appended claims for an understanding of the scope of the invention.

Having thus described my invention, what I claim and desire to protect by Letters Patent is:

1. A method of forming a rubber article comprising applying to a base a fluid organic solvent solution of rubber containing a latex coagulant and material which evaporates less readily than the rubber solvent and which is capable of effecting setting of the composition to a non-flowing gel on evaporation of a portion of the rubber solvent, allowing the volatile constituents of the composition to evaporate at least until setting occurs, and applying latex to the thus treated base.

2. A method of forming a rubber article comprising applying to a base a fluid organic solvent solution of rubber containing a latex coagulant and a proportion of desolvating agent which has a lower vapor pressure than the rubber solvent, insufficient to cause incipient flocculation of the rubber, allowing the volatile constituents of the composition to evaporate at least until the proportion of desolvating agent relative to the rubber solvent has increased sufficiently to effect setting of the composition, and applying latex to the thus treated base.

3. A method of forming a rubber article comprising applying to a base a fluid organic solvent solution of rubber containing an aqueous solution of a latex coagulant and a proportion of alcohol, relative to the rubber solvent, insufficient to cause incipient flocculation of the rubber, allowing the volatile constituents of the composition to evaporate at least until the proportion of alcohol relative to the rubber solvent has increased sufficiently to effect setting of the composition, and applying latex to the thus treated base.

4. A method of forming a rubber article comprising applying to a base a fluid organic solvent solution of rubber containing alcohol and an aqueous solution of a salt which is a latex coagulant, said alcohol being in a proportion, relative to the rubber solvent, insufficient to cause incipient flocculation of the rubber, allowing the volatile constituents of the composition to evaporate at least until the proportion of alcohol, relative to the rubber solvent, has increased sufficiently to effect setting of the composition, and then applying latex to the thus treated base.

5. A method of forming a rubber article comprising applying to a base a fluid organic solvent solution of rubber containing an aqueous solution of a latex coagulant, allowing the organic solvent to evaporate at least until the composition is set to a non-flowing gel, and applying latex to the thus treated base.

6. A method of forming a rubber article comprising associating a non-flowing rubber gel containing an aqueous solution of a latex coagulant distributed therethrough with a deposition base, and applying latex to the thus treated base.

7. A method of forming a rubber article comprising associating a non-flowing rubber gel containing an aqueous solution of a salt which is a latex coagulant with a deposition base, and applying latex to the thus treated base.

8. A method of forming a rubber article comprising associating a porous rubber layer containing a latex coagulant in the interstices thereof with a deposition base, and applying latex to the thus treated base.

9. A deposition form for the coagulation of latex thereon comprising a base and a coating on at least a portion of said base comprising a non-flowing rubber gel containing an aqueous solution of a latex coagulant distributed therethrough.

10. A deposition form for the coagulation of latex thereon comprising a base and a coating on at least a portion of said base comprising a porous rubber layer containing a latex coagulant in the interstices thereof.

11. A deposition form for the coagulation of latex thereon comprising a base and a coating on at least a portion of said base comprising a non-flowing rubber gel containing an aqueous solution of a salt which is a latex coagulant distributed therethrough.

STEWART R. OGILBY.